United States Patent [19]

Nio et al.

[11] Patent Number: 4,495,588
[45] Date of Patent: Jan. 22, 1985

[54] ROBOT LOCUS CONTROL SYSTEM

[75] Inventors: Satoru Nio; Shinobu Sato; Hajime Fujii, all of Kitakyushu; Toyoji Hamashima, Nakama, all of Japan

[73] Assignee: Kabushiki Kaisha Yaskawa Denki Seisakusho, Kitakyushu, Japan

[21] Appl. No.: 359,548

[22] Filed: Mar. 18, 1982

[30] Foreign Application Priority Data

Mar. 26, 1981 [JP] Japan .................................. 56-44275

[51] Int. Cl.³ .......................................... G05B 13/00
[52] U.S. Cl. ..................................... 364/513; 364/191; 364/192; 364/478; 318/568; 901/2; 901/3
[58] Field of Search ................ 318/568; 364/191, 192, 364/478, 513; 901/2, 3

[56] References Cited

U.S. PATENT DOCUMENTS

| Re. 30,016 | 5/1979 | Hohn | 364/513 X |
| 3,839,800 | 10/1974 | Bederman | 33/174 L |
| 3,920,972 | 11/1975 | Corwin, Jr. et al. | 364/513 X |
| 3,986,007 | 10/1976 | Ruoff, Jr. | 364/513 |
| 4,118,620 | 10/1978 | Wall, Jr. et al. | 219/124.32 |
| 4,156,835 | 5/1979 | Whitney et al. | 364/513 X |
| 4,380,696 | 4/1983 | Masaki | 318/568 X |

OTHER PUBLICATIONS

Automatic Welding, vol. 33, No. 7, Jul. 1980, pp. 26–29.

Primary Examiner—Jerry Smith
Assistant Examiner—Allen MacDonald
Attorney, Agent, or Firm—Ladas & Parry

[57] ABSTRACT

In a robot locus control metod, the coordinates of first three representative points and first work points of an object to be handled by a robot are taught to the robot, when the relative position of the robot and the object is changed, the coordinates of second three representative points corresponding to the first three representative points are taught, and the coordinates of second work points are calculated from the relative position of the first three representative points and the first work points and the second three representative points, thereby to command the robot working locus.

12 Claims, 16 Drawing Figures

ROBOT LOCUS CONTROL SYSTEM

BACKGROUND OF THE INVENTION

This invention relates to industrial robots, and more particularly to a system of controlling the locus of an industrial robot.

In the case of a conventional teaching playback robot, it is necessary to teach data for all of the parts of an object, even if a number of workpieces similar in configuration are included in the object or even when the robot handles the same objects set on a plurality of jigs.

Furthermore, when a working tool is deformed accidentally, the shifted positions must be amended by changing the data which have been taught to all the operating parts.

Teaching data to the robot takes a lot of time and labor. Therefore, simplification of the teaching operation is practically essential in order to improve the operability of the robot.

If, in the case where a number of robots are operated in a mass production line, any one of the robots becomes out of order, then it is necessary that the robot is replaced by an auxiliary robot immediately so that the production may not be stopped.

In order to replace the robot, it is essential that the robots are interchangeable and that the relative position of the robot, the jig and the object to be handled by the robot are strictly controlled and a mechanism for adjusting the relative position must be provided. However, these requirements involve various technical problems to be solved and it is unprofitable to satisfy all the requirements. Therefore, there has been a strong demand for the provision of an inexpensive method which ensures the interchanging of robots and simplifies the teaching operation.

SUMMARY OF THE INVENTION

Accordingly, an object of this invention is to provide a locus control method for an industrial robot by which, in the case where the robot handles a number of objects similar in configuration, the teaching operation is simplified, when a robot requires repair it can be replaced by an auxiliary robot immediately, and when a working tool is deformed the shifted positions can be readily amended.

The foregoing object and other objects of the invention have been achieved by the provision of a robot locus control method in which, according to the invention, the coordinates of a first three representative points and first work points of an object to be handled by a robot are taught to the robot, when the relative position of the object and the robot is changed the coordinates of a second three representative points corresponding to the first three representative points are taught to the robot, and the coordinates of second work points are calculated from the relative positions of the first three representative points and the first work points and the second three representative points, to provide instructions for a robot working locus.

The nature, principle and utility of the invention will become more apparent from the following detailed description when read in conjunction with the accompanying drawings.

DETAILED DESCRIPTION OF THE INVENTION

As conducive to a full understanding of this invention, first the principle of the invention will be described with reference to FIG. 1.

Let us consider the case where an object or a workpiece, which is handled with a robot, is moved from a position #a to a position #b. When an object at the position #a is moved parallel and is then turned about an axis in space, then it will coincided with an object at the position #b.

It is assumed that the three representative points $P_1$, $P_2$ and $P_3$ (hereinafter referred to as "first representative points") of the object at the position #a and the work points (for instance welding lines) $P_4$, $P_5$, ... and $P_n$... (hereinafter referred to as "first work points") have been taught to the robot.

The corresponding representative points $P_1'$, $P_2'$ and $P_3'$ (hereinafter referred to as "second representative points") of the object which is moved to the position #b are taught to the robot. The amount of shift in three-dimensional rotation plus parallel movement from a surface defined by the points $P_1$, $P_2$ and $P_3$ to a surface defined by the points $P_1'$, $P_2'$ and $P_3'$ is obtained, so that the positional data of new work points $P_4'$, $P_5'$, ... and $P_n'$... (hereinafter referred to as "second work points") are automatically obtained by carrying out the calculation which is equivalent to the translation of the relationship between the work points $P_4$, $P_5$, ... and $P_n$..

and the surface defined by the points $P_1$, $P_2$ and $P_3$ to the surface defined by the points $P_1'$, $P_2'$ and $P_3'$.

In other words, merely by teaching the three representative points $P_140$, $P_2'$ and $P_3'$, the positional data of all the work points $P_4'$, $P_5'$, ... and $P_n'$ ... of the object at the position #b are automatically provided. Thus, the efficiency of teaching operation is greatly improved.

Figure 2:
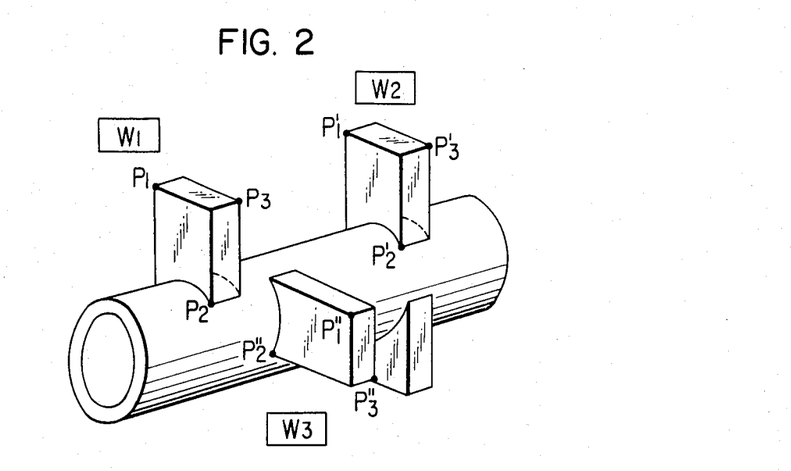
FIG. 2 is a perspective view showing an object having a number of congruent workpieces, for a description of one example of a teaching operation according to the invention.

FIG. 2 shows one example of the teaching in which the above-described technical concept is applied to an object in which a number of similar workpieces are arranged. In this case, merely by teaching the welding lines and representative points $P_1$, $P_2$ and $P_3$ of a workpiece $W_1$, the representative points $P_1'$, $P_2'$ and $P_3'$ of a workpiece $W_2$, the representative points $P_1''$, $P_2''$ and $P_3''$ of a workpiece $W_3$ and so forth, the positional data of the welding lines of the workpieces $W_2$, $W_3$ and so forth are automatically provided.

Figure 3:
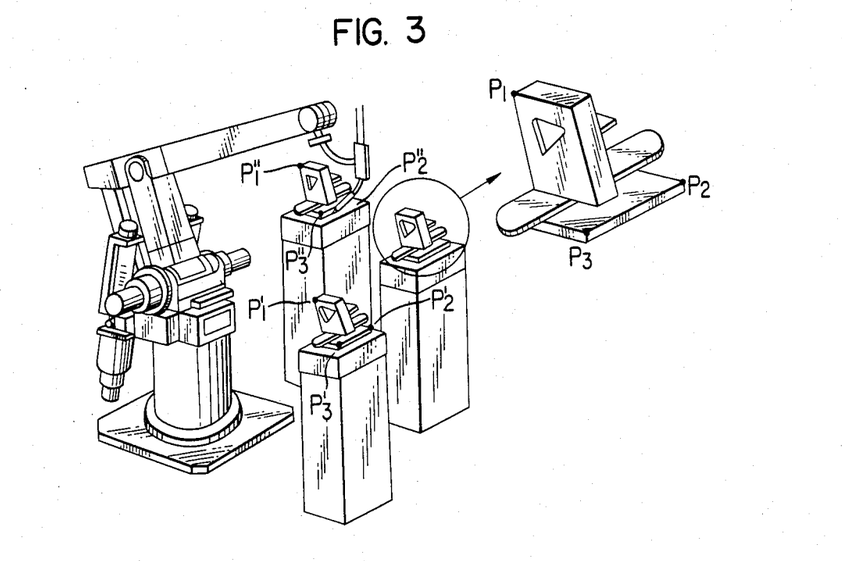
FIG. 3 is a perspective view showing one robot which handles a number of similar objects, for a description of another example of the teaching operation according to the invention.

FIG. 3 shows one example of the teaching in the case where one robot handles objects which are similar in configuration and are set on a plurality of jigs, respectively. In general, in the case of an industrial robot, a single robot handles objects set respectively on two or three jigs, and while the robots handles one object, another object is loaded on another jig; that is, loading and unloading an object and handling another object with the robot are carried out in a parallel mode, so that the idling time of the robot is eliminated to provide an effective or efficient work system. In this case also, merely by teaching the robot an object on one jig and also only the representative points $P_1$, $P_2$, $P_3$, $P_1'$, $P_2'$, $P_3'$, $P_1''$, $P_2''$, $P_3''$ and so on, all the positional data of the other objects on the other jigs are automatically provided.

Figure 4:
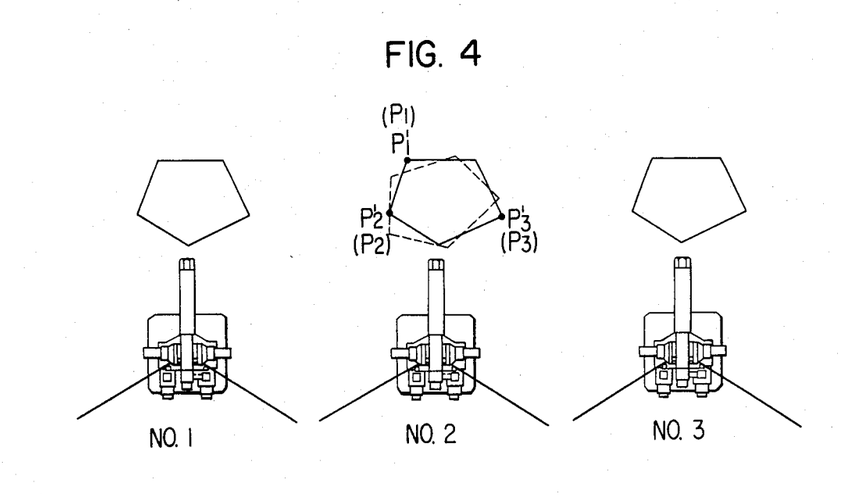
FIG. 4 is an explanatory diagram, for a description of a robot exchanging operation according to the invention.

FIG. 4 is an explanatory diagram for a description of a robot interchangeability which is required in exchanging robots. In the case where a plurality of robots are operated in a large scale production line, a robot interchangeability function is required so that, immediately when a robot becomes out of order, it is replaced by another one and the new robot is operated with the same teaching data (as that of the old robot since the same control device is used). However, since the robots are not always equal in mechanical dimension and the relative position of the jig and the robot is, in general, shifted during the robot exchanging operation, the robot interchangeability cannot be achieved merely by replacing the troubled robot. When a robot #2 (FIG. 4) is replaced by an auxiliary robot, the locus (solid line) of the robot #2, which was drawn before it became out of order, is shifted as indicated by the dotted line. The representative points $P_1$, $P_2$ and $P_3$ on the locus (solid line) have been taught to the robot and stored in a memory in the control device. Under this condition, only three representative points $P_1'$, $P_2'$ and $P_3'$ of the object are taught to the auxiliary robot. Then, all the positional data indicated by the dotted line are automatically amended to the positional data indicated by the solid line by means of the calculation of three dimensional parallel and rotational shift by use of the first representative points and the second representative points. Thus, the robot has been replaced by the auxiliary robot correctly.

Although the points $P_1$, $P_2$ and $P_3$ of the object are the same points $P_1'$, $P_2'$ and $P_3'$ of the same object, respectively, the data indicated by the dotted line become the data indicated by the solid line, because the points $P_1$, $P_2$ and $P_3$ taught to the troubled robot are different from the points $P_1'$, $P_2'$ and $P_3$ taught to the auxiliary robot in the pulse values from the original points of the robot drive axes. Owing to this function, control of the relative position of the robot and the jig is unnecessary, and the troubled robot can be replaced by the auxiliary robot correctly.

Figure 5:
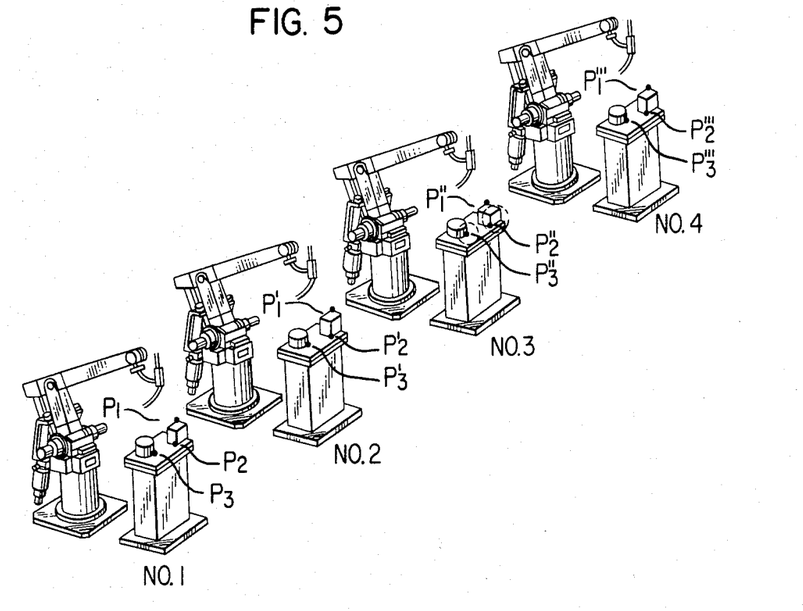
FIG. 5 is a perspective view showing a plurality of robots handling a plurality of similar objects, for a description of another example of the teaching operation according to the invention.

FIG. 5 shows one example of the teaching according to the function in the case where a plurality of robots handle objects each of which has the same configuration. In this case, teaching is effected with one robot #1, and the data are stored in a cassette tape and are then inputted to the control devices of robots #2, #3, #4 and so on. With the data thus inputted, the robots #2, #3, #4 and so on cannot be operated, because the robots are different in mechanical dimension or the relative positions of the robots and the jigs are different, which causes the working position of each robot to deviate. The position deviation of the robot #3 is as indicated by the broken lines, by way of example. In this case, all the position deviations can be automatically amended merely by teaching the representative points $P_1'$, $P_2'$, $P_3'$, $P_1''$, $P_2''$, $P_3''$ and so on of the robots #2, #3 and so on according to the above-described function.

Figure 6:
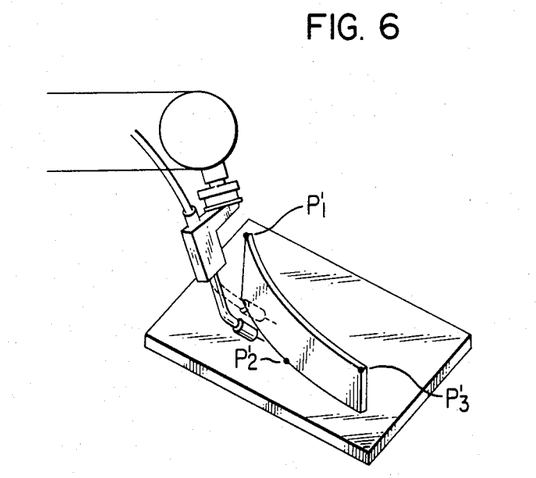
FIG. 6 is an explanatory diagram for a description of the application of the invention to amendment of contents which have been taught when a working tool is deformed.

FIG. 6 is an explanatory diagram for a description of the case where the above-described function is employed to amend data which have been taught when a work tool is deformed. In teaching, sometimes the operator strikes the work tool against the jig or the like accidentally and the tool is deformed. In general, in the case where various products are manufactured on small scale by one robot, job data are provided in correspondence to the number of kinds of products. If the deformed tool is operated according to the job data which have been stored in the control device, then the position of the tool is caused to deviate as shown by the dotted line in FIG. 6. This difficulty may not be eliminated by repairing the deformed tool or by replacing it by a new one. However, since tools are, in general, not interchangeable, the amount of positional deviation cannot be completely eliminated, although it may be reduced. In such a case, the above-described function is effective. Automatic amendment to job data including no positional deviation can be achieved merely by teaching the representative points $P_1'$, $P_2'$ and $P_3'$.

Figure 7:
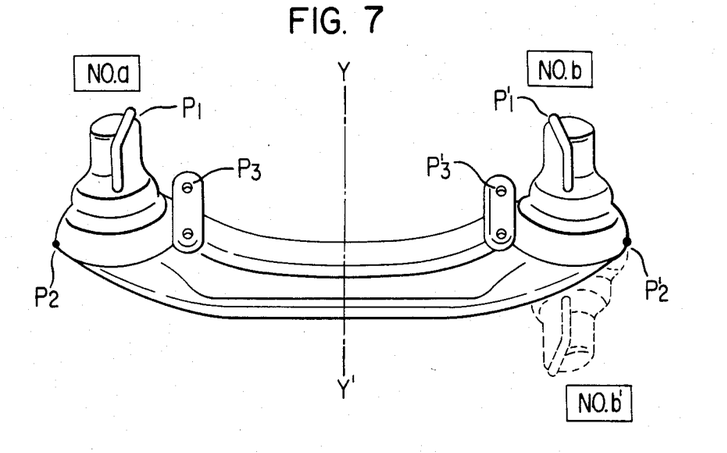
FIG. 7 is a diagram for a description of mirror image shifting.

FIG. 7 shows an example of a mirror image type shift, which is different from the three-dimensional rotation plus parallel movement shift as explained from FIG. 2 to FIG. 6. An object may not be made to coincide with an object #b no matter how it is turned or moved in parallel, because the objects #a and #b are not congruent with each other and are symmetrical with each other with respect to a plane including a line Y—Y, as frequently found with symmetrical parts such as vehicle members. When the object #a is turned and moved in parallel, then it comes to such position as shown by #b', and in this case the object (#b') is an mirror image of the object #b. One object is first turned and moved in parallel so that it is in contact with and in symmetry with the other object with respect to a plane, and then the mirror image shift is effected in symmetry with the plane. Then, similarly as in the cases of FIGS. 2 through 6, the positional data of the object #b for work can be automatically provided merely by teaching the teaching data at #a and representative points $P_1$, $P_2$ and $P_3$ of the object #a and the representative points $P_1'$, $P_2'$ and $P_3'$ of the object #b.

As was described above, the invention is intended to provide a locus shift control method in which, merely by teaching three representative points, teaching is simplified in handling objects similar in configuration with a robot, robots can be exchanged correctly, teaching can be simplified when a gun is deformed, and teaching can be simplified when a robot handles an object having parts which are symmetrical in mirror image manner.

The invention will be described in more detail.

Figure 1:
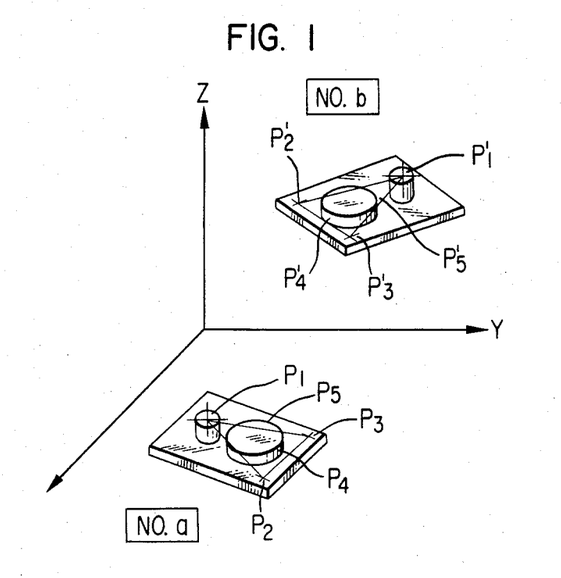
FIG. 1 is an explanatory diagram for a description of the principle of this invention.
Figure 8:
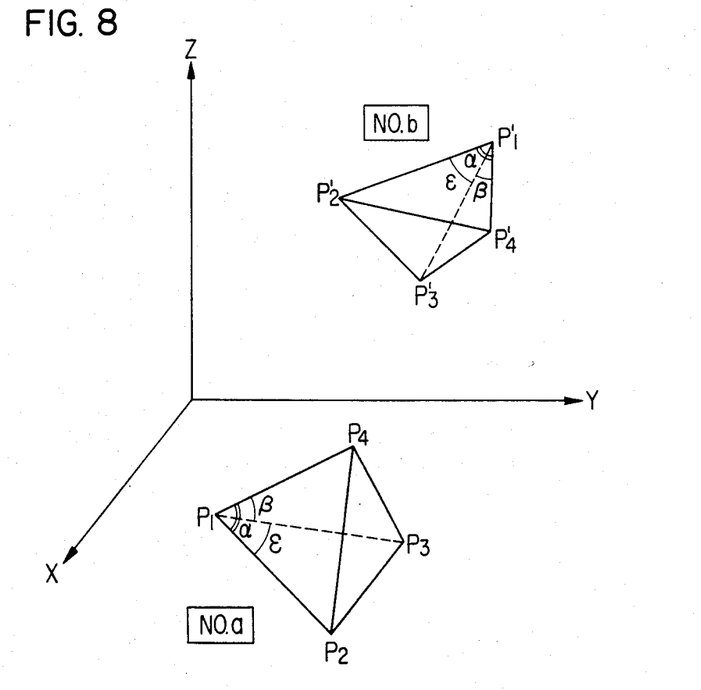
FIG. 8 is a model diagram showing various points on objects in FIG. 1.

FIG. 8 is a model diagram extracting the points $P_1$, $P_2$, $P_3$ and $P_4$, and the points $P_1'$, $P_2'$, $P_3'$ and $P_4'$ in FIG. 1. The problem, in this case, is to obtain the coordinates of the points $P_4'$ from the coordinates of the points $P_1$, $P_2$, $P_3$, $P_1'$, $P_2'$, $P_3'$ and $P_4$. Similarly, the coordinates of other points $P_5'$, ... $P_n'$, ... can be obtained by successively replacing the coordinates of the point $P_4$ with the coordinates of points $P_5$, ... $P_n$, ...

The coordinates of the taught points $P_1$, $P_2$, $P_3$, $P_1'$, $P_2'$, $P_3'$ and $P_4$ are as follows:

$$\left. \begin{array}{ll} P_1(X_1, Y_1, Z_1) & P_1'(X_1', Y_1', Z_1') \\ P_2(X_2, Y_2, Z_2) & P_2'(X_2', Y_2', Z_2') \\ P_3(X_3, Y_3, Z_3) & P_3'(X_3', Y_3', Z_3') \\ P_4(X_4, Y_4, Z_4) & \end{array} \right\} \quad (1)$$

$\angle P_2P_1P_4 = \alpha$, $\angle P_2P_1P_4 = \beta$ and $\angle P_2P_1P_3 = \epsilon$ are internal angles of $\Delta P_2P_1P_4$, $\Delta P_3P_1P_4$ and $\Delta P_2P_1P_3$, respectively, and can be readily obtained from the coordinates of the points $P_1$, $P_2$, $P_3$ and $P_4$.

As the same object is merely moved, these angles remain unchanged. Therefore $\angle P_2'P_1'P_4' = \alpha$, $\angle P_3'P_1'P_4' = \beta$ and $\angle P_2'P_1'P_3' = \epsilon$.

The direction cosine (l, m, n) of $\overline{P_1'P_2'}$ and the direction cosine (h, i, j) of $\overline{P_1'P_3'}$ can be readily obtained from the coordinates of the points $P_1'$, $P_2'$ and $P_3'$.

Accordingly, the direction cosine (a, b, c) of $\overline{P_1'P_4'}$ is defined by the following expression (2):

$$\left. \begin{array}{l} a = f_1(\alpha, \beta, \epsilon, l, m, n, h, i, j) \\ b = f_2(\alpha, \beta, \epsilon, l, m, n, h, i, j) \\ c = f_3(\alpha, \beta, \epsilon, l, m, n, h, i, j) \end{array} \right\} \quad (2)$$

In the case of mirror image, the direction cosine (a, b, c) is defined by the following expression (3):

$$\left. \begin{array}{l} a = f_1'(\alpha, \beta, \epsilon, l, m, n, h, i, j) \\ b = f_2'(\alpha, \beta, \epsilon, l, m, n, h, i, j) \\ c = f_3'(\alpha, \beta, \epsilon, l, m, n, h, i, j) \end{array} \right\} \quad (3)$$

$\overline{P_1P_4}(=L)$ is obtained from the coordinates of the points $P_1$ and $P_4$. As $\overline{P_1'P_4'} = L$, the coordinates $X_4'$, $Y_4'$, $Z_4'$ can be obtained from the following expression (4):

$$\left. \begin{array}{l} X_4' = X_1' + L \cdot a \\ Y_4' = Y_1' + L \cdot b \\ Z_4' = Z_1' + L \cdot c \end{array} \right\} \quad (4)$$

Figure 9:
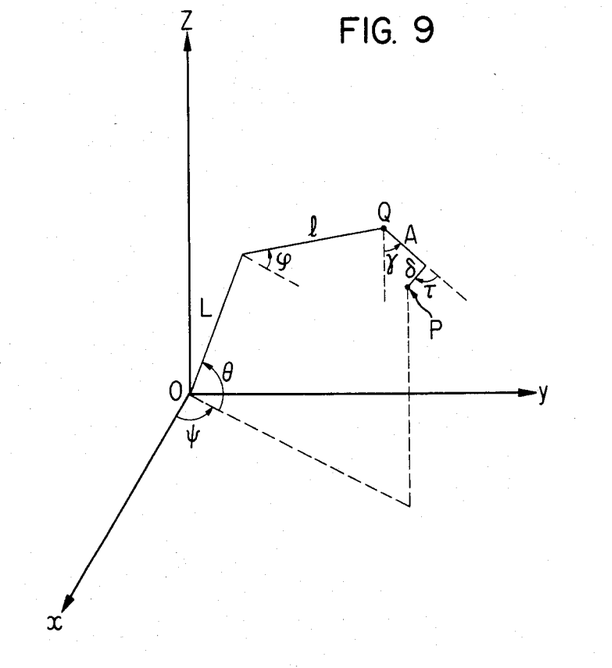
FIG. 9 is a model diagram showing an articulated robot.

In the expression (4), the coordinates of the point $P_4'$ is obtained according to $\overline{P_1P_4}$; however, it goes without saying that the coordinates may be obtained according to $\overline{P_2P_4}$ or $\overline{P_3P_4}$. Furthermore, the average coordinates of the point $P_4'$ may be obtained by averaging three different coordinates of the point $P_4'$ which are obtained according to $\overline{P_1P_4}$, $\overline{P_2P_4}$ and $\overline{P_3P_4}$, respectively. As is shown in FIG. 9, a robot is controlled according to five axes ($\psi$, $\theta$, $\phi$, $\gamma$, $\pi$), and therefore the teaching of the wrist is effected together with that of points $P_1$, $P_2$, $P_3$, $P_1'$, $P_2'$ and $P_3'$.

In general, the posture of the wrist is determined according to the content of work which should be done by the robot, and an object which is handled by the robot. For instance in the case of an arc welding robot, the posture of the wrist is controlled so that a welding torch angle and a welding torch advancing angle along the welding line of an object are maintained unchanged within the range suitable for the welding operation.

Since the objects #a and #b are at different positions, the wrist posture for the object #a is different from that for the object #b. Accordingly, the wrist postures for the points $P_4'$, $P_5'$, ..., $P_n'$, ... cannot be used for the points $P_4$, $P_5$, ..., $P_n$, ..., as they are. For this reason, when the wrist bending axis ($\gamma$: variable) and the wrist turning axis ($\pi$: variable) take, as shown in FIGS. 9 and 10, positions represented by the following points $P_1(\gamma_1, \pi_1)$, $P_2(\gamma_2, \pi_2)$, $P_3(\gamma_3, \pi_3)$, $P_1'(\gamma_1', \pi_1')$, $P_2'(\gamma_2', \pi_2')$ and $P_3'(\gamma_3', \pi_3')$, $\Delta\gamma$ and $\Delta\pi$ are calculated by the following equations (5)

$$\left. \begin{array}{l} \Delta\gamma = g_1(\gamma_1', \gamma_1, \gamma_2', \gamma_2, \gamma_3', \gamma_3) \\ \Delta\pi = g_2(\pi_1', \pi_1, \pi_2', \pi_2, \pi_3', \pi_3) \end{array} \right\} \quad (5)$$

(where $g_1$ and $g_2$ show symbols representing function, respectively.)

Thus, the wrist posture of a robot in a new position #b can be amended by adding $\Delta\gamma$ and $\Delta\pi$ to the wrist posture taught in a previous position #a. Namely, point $P_4'$ ($\gamma_4'$, $\pi_4'$) can be obtained from the teaching data $P_4$ ($\gamma_4$, $\pi_4$) by the following equation (6) thereby to effect correct amendments to the wrist posture.

$$\left. \begin{array}{l} \gamma_4' = \gamma_4 + \Delta\gamma \\ \pi_4' = \pi_4 + \Delta\pi \end{array} \right\} \quad (6)$$

The data $\Delta\pi$ and $\Delta\gamma$ can be obtained in various methods. For instance, a method may be employed in which $\Delta\pi$ and $\Delta\gamma$ are defined by the average value of the difference between the postures of the robot wrist axis respectively when the operation end of the robot are at the first and second representative points. Alternatively, a method may be employed in which $\Delta\pi$ and $\Delta\gamma$ are defined by the difference between the wrist axis posture at the first representative point where the difference between the wrist axis postures respectively when the operation end of the robot is at the first representative point and the first work point, is minimum, and the wrist axis posture at the second representative point corresponding to the first representative point. The latter method is effective in the case where the wrist axis posture is greatly changed.

In the case of a cartesian coordinates robot, the coordinates of the points, $P_1$, $P_2$, $P_3$, $P_4$, $P_1'$, $P_2'$ and $P_3'$ are stored in terms of X, Y, Z, and therefore $P_4'$ ($X_4'$, $Y_4'$, $Z_4'$, $\gamma_4'$, $\pi_4'$) can be obtained from the expressions (1) through (6). In the case of an articulated robot, a cylindrical coordinates robot or a polar coordinates robot, the taught data of the drive axes must be subjected to orthogonal coordinate transformation to obtain the expression (1). The data $X_4'$, $Y_4'$, $Z_4'$ except the data $\gamma_4'$, $\pi_4'$ of the wrist are required to inversely transform their coordinates into those which are proper to each of three drive axis of the robot.

FIG. 9 shows a model of an articulated robot. The swivel axis, the lower arm axis L and the upper arm axis l are controlled by rotation angles $\psi$, $\theta$ and $\phi$, respectively. The wrist bending axis, and the wrist turning axis are controlled by rotation angles $\gamma$ and $\pi$, respectively.

Figure 10A:
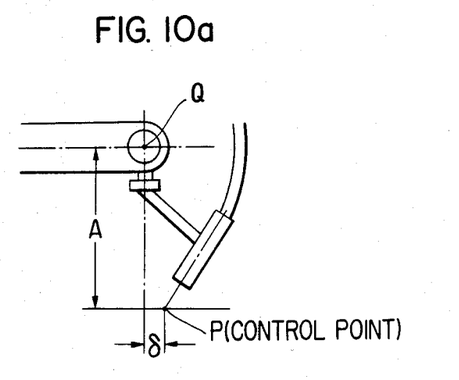
FIG. 10a is an external view showing the wrist of an articulated robot and a tool coupled to the wrist.

FIG. 10a is an external view showing the wrist of the articulated robot and a tool secured to the wrist.

The point P, which is at a distance A from the center Q of rotation of the wrist bending axis and at a distance $\delta$ from the center of rotation of the wrist turning axis, is a control point to be taught. Therefore, the coordinates of the point P in the orthogonal coordinate system are as follows:

$$X = (L\cos\theta + l\cos\phi + A\sin\gamma + \delta\cos\tau \cdot \cos\gamma) \cdot \cos\psi - \delta\sin\tau \cdot \sin\psi$$
$$Y = (L\cos\theta + l\cos\phi + A\sin\gamma + \delta\cos\tau \cdot \cos\gamma) \cdot \sin\psi + \delta\sin\tau \cdot \cos\psi$$
$$Z = L\sin\theta + l\sin\phi - A\cos\gamma + \delta\cos\tau \cdot \sin\gamma$$
(7)

As the data $\gamma_4'$, $\pi_4'$ of the wrist axis have been defined according to the expression (6), the coordinates of the point $P_4'(X_4', Y_4', Z_4', \gamma_4', \pi_4')$ on the articulated axis are defined by the following expression (8) which is obtained by subjecting the expression (7) to inverse transformation.

$$\psi_4' = f_7(X_4', Y_4', Z_4', \gamma_4', \tau_4')$$
$$\theta_4' = f_8(X_4', Y_4', Z_4', \gamma_4', \tau_4')$$
$$\phi_4' = f_9(X_4', Y_4', Z_4', \gamma_4', \tau_4')$$
(8)

In general, in a robot teaching operation, not only teaching of points to be taught but also teaching of the posture of a tool connected to the robot wrists with respect to a workpiece are essential.

In the case of a welding robot, the wrist axes are taught so that a torch coupled to the wrist holds angles (torch angle and an advancing angle) necessary for welding with respect to the welding line of a workpiece.

If the posture of the torch with respect to the welding line at each of teaching points, which is taught in a master job, is the same as the posture with respect to the welding line at each of the corresponding points in a slave job which is three-dimensionally shifted, then a posture necessary for work can be obtained.

For this purpose, the angle between a surface defined by three representative points and a torch at each teaching point on the master job must be the same as those on the three-dimensionally shifted slave job, respectively.

In practice, the wrist axes must be so controlled that the angle between a line connecting one of the three representative points to the work point and the axis of the torch connected to the wrist is maintained unchanged or substantially unchanged before and after three-dimensional locus shifting.

Figure 10B:
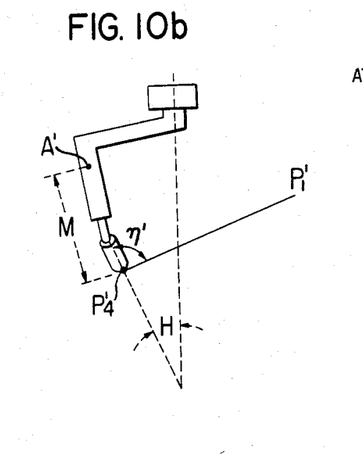
FIGS. 10b through 10e are explanatory diagrams for a description of the two-axes control of the wrist.

In FIG. 10b, $P_1'$ designates one representative point on the slave job; $P_4'$, a work point; and $A'$, an arbitrary point on the central axis of a welding torch connected to the robot wrist.

In this case, an angle $\eta'$ between segments $\overline{P_1'P_4'}$ and $\overline{A'P_4'}$ should be controlled.

On the master job, $P_1$, $P_4$, A and $\eta$ are employed instead of $P_1'$, $P_4'$, $A'$ and $\eta'$, respectively. The two wrist axes are controlled so that $\eta' = \eta$.

In this case, it is necessary to define an angle H. The angle H is intended to mean the angle between the center of rotation of a wrist turning axis and an axis line of a welding torch. The angle $\eta$ at the point $P_4$ on the master job is represented in the form of the direction cosine (a, b, c) of $\overrightarrow{P_4A}$ which is expressed by the following expression (9).

$$a = f_1(\gamma_4, \psi_4, \tau_4, H)$$
$$b = f_2(\gamma_4, \psi_4, \tau_4, H)$$
$$c = f_3(\gamma_4, \psi_4, \tau_4, H)$$
(9)

Figure 10C:
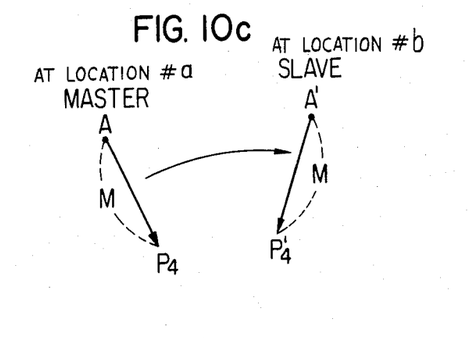

Now, as shown in FIG. 10b and FIG. 10c, a length M from a work point is defined on the central axis of a welding torch. It is assumed that the length M remains unchanged both on the master job and on the slave job.

The coordinates $(X_A, Y_A, Z_A)$ of a point A on the master job are:

$$X_A = X_4 + aM$$
$$Y_A = Y_4 + bM$$
$$Z_A = Z_4 + cM$$
(10)

The point A is subjected to three-dimensional locus shifting according to three representative points. It is assumed that, after the three-dimensional locus shifting, the coordinates on the slave job designate a point $A'$.

From the coordinates $(X_4', Y_4', Z_4')$ of the point $P_4'$, the direction $\psi_4'$ of an arm is:

$$\psi_4 = \tan^{-1}\frac{Y_4'}{X_4'}$$
(11)

Thus, the direction cosines (a', b', c') of $\overrightarrow{P_4'A'}$ are:

$$a' = f_1(\gamma_4', \psi_4', \tau_4', H)$$
$$b' = f_2(\gamma_4', \psi_4', \tau_4', H)$$
$$c' = f_3(\gamma_4', \psi_4', \tau_4', H)$$
(12)

Also, a', b' and c' can be readily obtained from the coordinates of the points $P_4'$ and $A'$.

$$a' = g_1(X_4', X_A', M)$$
$$b' = g_2(Y_4', Y_A', M)$$
$$c' = g_3(Z_4', Z_A', M)$$
(13)

From the expressions (12) and (13), $\gamma_4'$ and $\pi_4'$ are:

$$\left.\begin{array}{l} \tau_4' = F_1(\psi_4', H, M, X_4', X_A', Y_4', Y_A') \\ \gamma_4' = F_2(\psi_4', H, M, X_4', Y_4', Z_4', X_A', Y_A', Z_A') \end{array}\right\} \quad (14)$$

Figure 10D:
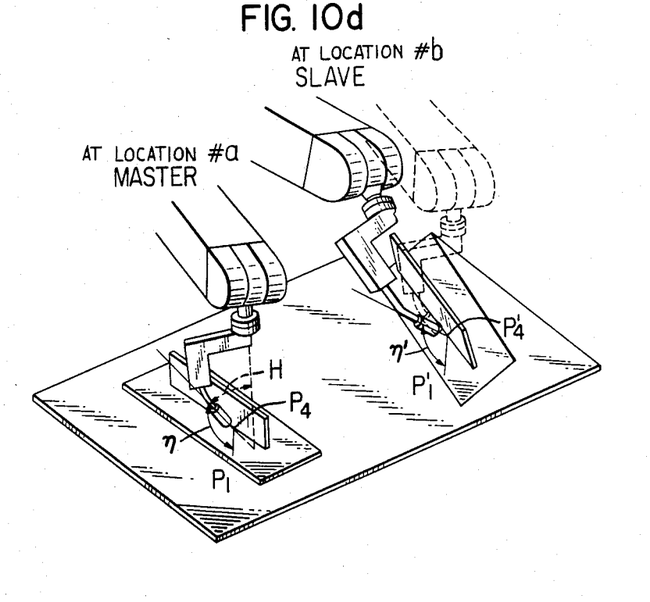
Figure 10E:
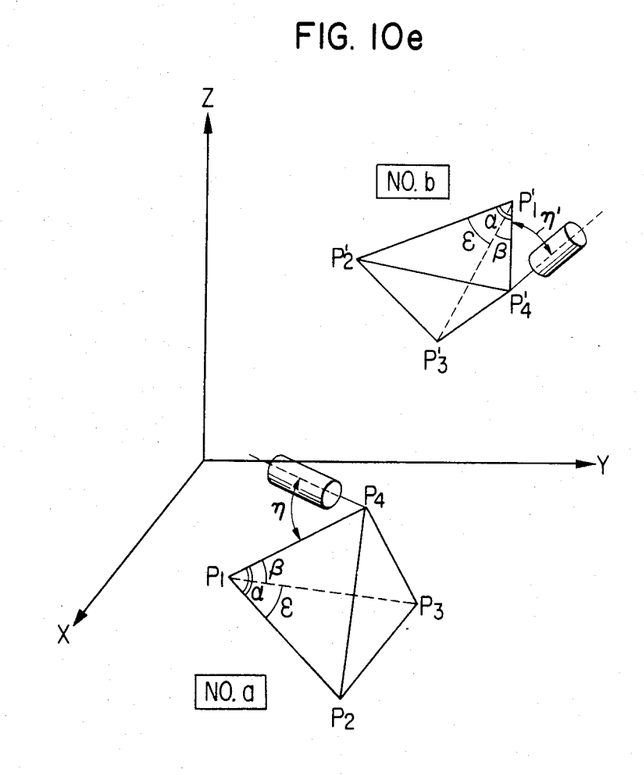

These relationships are illustrated in FIGS. 10d and 10e. As is apparent from the above description, the wrist axis is controlled on the slave job so that its posture indicated by the dotted line in FIG. 10d is changed to one indicated by the solid line.

Figure 11:
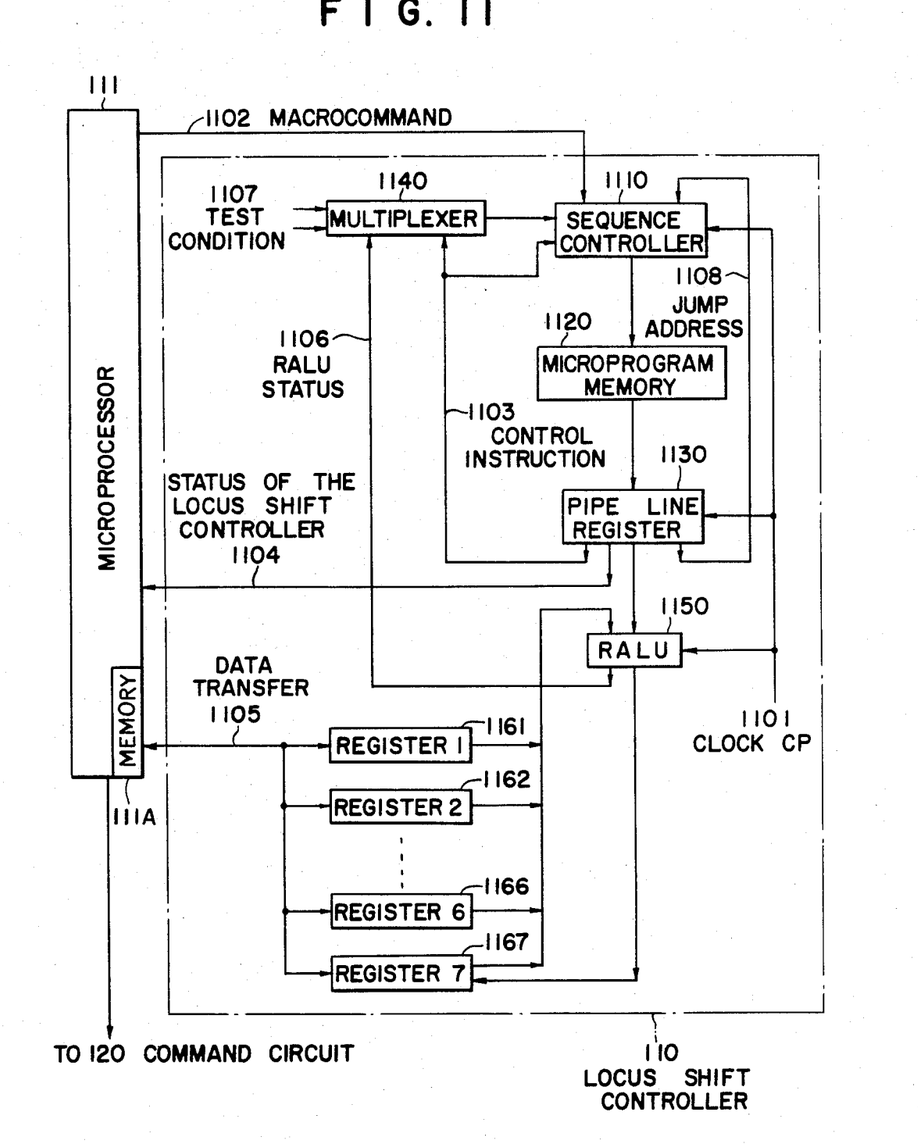
FIG. 11 is a block diagram showing a locus shift controller comprising arithmetic units, and a microprocessor for controlling the operation of a robot.

FIG. 11 is a block diagram showing a locus shift controller comprising arithmetic units, and a microprocessor for controlling the operation of a robot, according to one embodiment of the invention.

When a status 1104 of the locus shift controller 110 is in a wait state and locus shift data are required, the microprocessor 111 reads the coordinates of the points $P_1$, $P_2$, $P_3$, $P_1'$, $P_2'$, $P_3'$ and $P_4$ out of a memory 111A and sets them in registers "1" through "7" 1161 through 1167 (through data transfer 1105), and outputs a locus shift data forming macrocommand 1102.

The locus shift controller 110 is made up of a sequence controller 1110, a microprogram memory 1120, a pipe line register 1130, a multiplexer 1140, an RALU (register and arithmetic logical unit)1150 and the aforementioned registers "1" through "7" 1161 through 1167.

The sequence controller 1110 is an address controller for controlling the execution sequence of microinstructions stored in the microprogram memory 1120. The sequence controller 1110 carries out various addressing operations and stack controls in response to control instructions from the pipe line register 1130. More specifically, the sequence controller 1110 deals with increment of an address being executed, address selection specified by a macrocommand 1102, jump address selection 1108 which is provided by the pipe line register 1130 in the case of a conditional jump according to the test condition 1107 of an RALU status 1106, a jump address section 1108 which is provided by the pipe line register 1130 in the case of a non-conditional jump, and stack control at the time of microsubroutine call.

Input data for addressing are the macrocommand 1102, and an output 1108 of the pipe line register 1130.

Depending on the microprogram, i.e., the control instruction 1103 from the pipe line register 1130, it is determined whether the sequence controller 1110 selects one of the two input data or selects none of the two input data to carry out the current address increment. Two locus shift data forming macrocommands, namely, a rotation plus parallel movement command and a mirror image command are used.

The commands are provided in such a manner as to indicate the top address of a locus shift data forming microprogram, in view of hardware.

The microprogram memory 1120 is an essential element in the locus shift controller 110, and all arithmetic operations are carried out according to instructions from the microprogram memory 1120.

The pipe line register 1130 is a buffer register for the microprogram memory 1120. The pipe line register 1130 applies an operating microinstruction to be executed at the present to the RALU 1150, applies a control instruction 1103 for determining the next microaddress to the sequence controller 1110 and the multiplexer 1140, and applies a jump address 1108 and a subroutine call address to the sequence controller 1110. Also, a status 1104 signal for indicating "BUSY (locus shift data are under preparation)" and "wait" is outputted to the microprocessor 111.

The pipe line register 1130 forms two signal paths in such a manner that operations in the signal paths are carried out in a parallel mode, to reduce micro cycle time, thereby increasing processing speed.

One of the signal paths is of the control system, consisting of the pipe line register 1130, the sequence controller 1110 and the microprogram memory 1120, and the other is of the arithmetic system, consisting of the pipe line register 1130 and the RALU 1150. The pipe line register 1130 is provided to permit the operations in the two paths to be performed simultaneously in the same clock cycle.

At the rise of a clock CP 1101, the next instruction of the microprogram prepared in the path of the control system is applied to the input of the pipe line register 1130. Therefore, a high speed operation, in which the memory fetch time is substantially zero, can be carried out.

The multiplexer 1140 applies the test condition 1107 of the RALU status 1106 to the sequence controller 1110 according to the control instructions from the pipe line register 1130, to cause the sequence controller 1110 to execute the conditional jump.

The RALU 1150 comprises a logic and arithmetic operation unit and a programmable register, and carries out operation instructions specified by the microprogram memory 1120. The operation result, i.e., the locus shift data $P_4'$ is stored in the register "7" 1167.

The registers "1" through "6" 1161 through 1166 store the coordinate data of the points $P_1$, $P_2$, $P_3$, $P_1'$, $P_2'$ and $P_3'$. Initially the coordinate data of $P_n$, which is to be shifted, is set in the register "7" 1167. After the shift data has been formed, the coordinate data shifted, namely the data of $P_n'$ is set in the register "7" 1167.

Formation of the locus shift data will be described with reference to FIG. 11.

Initially, the locus shift controller executes a wait routine and then the pipe line register 1130 applies a wait status signal (1104) to the microprocessor 111. Upon reception of the locus shift data forming macrocommand 1102, the sequence controller 1110 carries out address control so as to execute the wait routine, while receiving the control instructions 1103 for selecting the top address of the service microprogram from the pipe line register 1130.

Before starting the locus shift, the microprocessor 111 sets the coordinates of $P_1(X_1, Y_1, Z_1, \gamma_1, \pi_1)$, $P_2(X_2, Y_2, Z_2, \gamma_2, \pi_2)$, $P_3(X_3, Y_3, Z_3, \gamma_3, \pi_3)$, $P_1'(X_1', Y_1', Z_1', \gamma_1', \pi_1')$, $P_2'(X_2', Y_2', Z_2', \gamma_2', \pi_2')$, $P_340 (X_3', Y_3', Z_3', \gamma_3', \pi_3')$ and the coordinates of data $P_4(X_4, Y_4, Z_4, \gamma_4, \pi_4)$ to be shifted in the registers "1" through "7" 1161 through 1167, in the case of a cartesian coordinates robot.

For instance in the case of an articulated robot, the coordinates of $P_1(\psi_1, \theta_1, \phi_1, \gamma_1, \pi_1)$, $P_2(\psi_2, \theta_2, \phi_2, \gamma_2, \pi_2)$ and so forth are set in the registers "1" through "7".

When the microprocessor 111 outputs the locus shift data forming macrocommand 1102, the service program is executed, and the status 1104 becomes busy.

In the case of the articulated robot, the locus shift controller obtains the expression (1) from the expression (7) by using the coordinates set in the registers "1" through "7" 1161 through 1167.

In the case of the cartesian coordinates robot, the expression (1) is given by the registers "1" through "7" 1161 through 1167.

The data $\alpha, \beta, \epsilon, l, m, n, h, i$ and $j$ are calculated, so that the direction cosines (a, b, c) are obtained according to the expression (2) in the case of the rotation plus parallel movement macrocommand, or according to the expression (3) in the case of the mirror image command, and the coordinates X, Y, Z of the point $P_4'$ are obtained from the expression (4). The wrist posture $\gamma_4', \pi_4'$ is obtained by inserting the expressions (5) and $P_4(\gamma_4, \pi_4)$ in the expression (6) or is obtained by the expressions (14).

In the case of the cartesian robot, the value $P_4'$ ($X_4', Y_4', Z_4', \gamma_4', \pi_4 40$) is set in the register "7" 1167, and the status signal 1104 comes to represent a waiting state as a result of which the locus shift controller 110 returns to a waiting routine.

In the case of the articulated robot, the data $\phi_4', \theta_4'$ and $\phi_4'$ obtained from the expression (8) and the data $\gamma_4'$ and $\pi_4'$ which have been obtained already are set in the register "7" 1167 and the locus shift controller 110 waits.

When the status signal 1104 is changed from "busy" to "wait", the microprocessor 111 transfers the contents of the register "7" 1167 to the memory (not shown).

Next, the coordinate data $P_5$ to be newly shifted is set in the register "7" 1167, and similarly as in the above-described operation the point $P_5'$ is stored in the memory. This operation is carried out repeatedly until all the data are formed.

Figure 12:
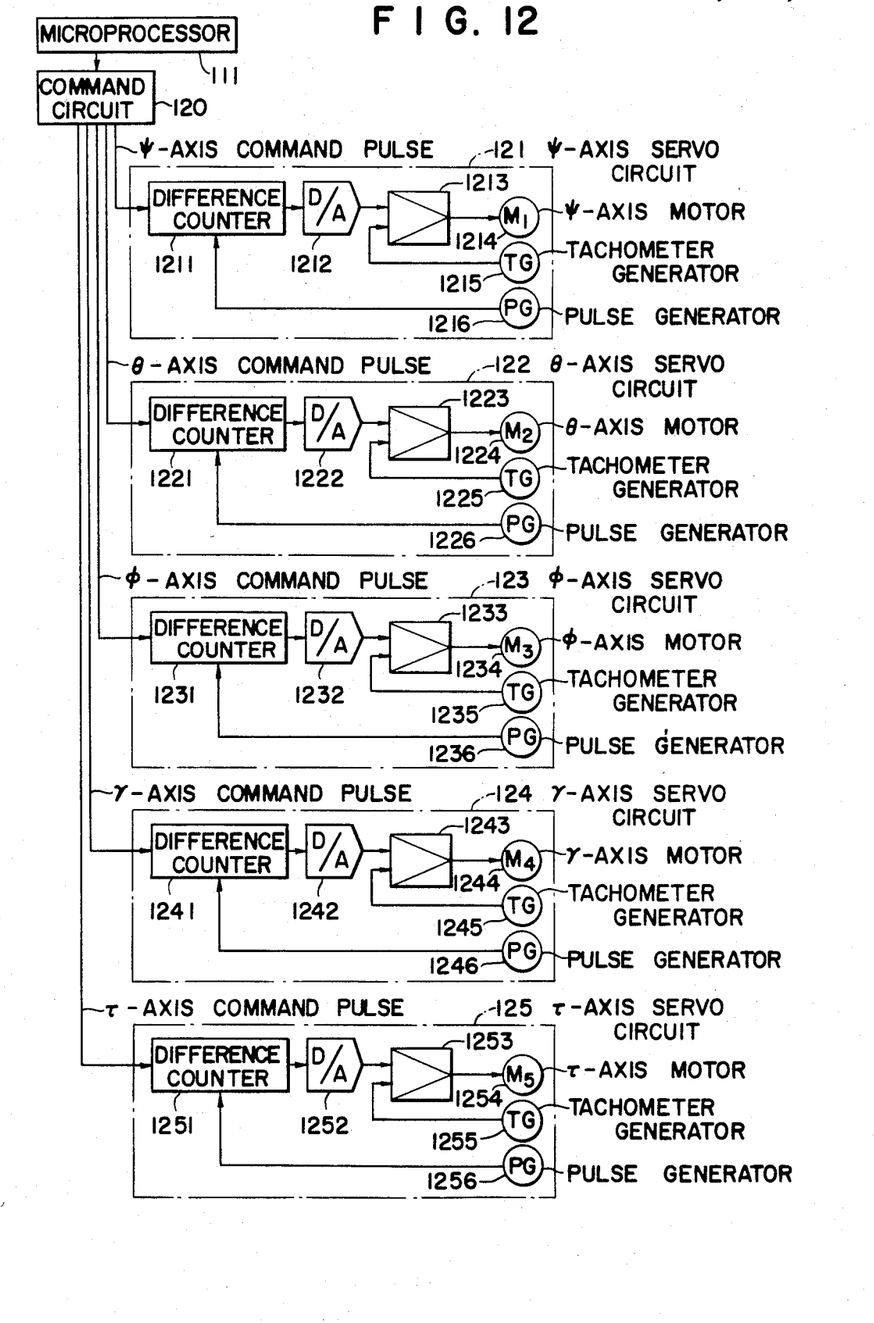
FIG. 12 is a block diagram showing the microprocessor and axis motors which are driven by command from the microprocessor.

FIG. 12 shows the relationships between the microprocessor and the axis motors which are controlled by commands from the microprocessor. During the playback, positional deviation value, of each of axes at the present position of the operation point of the robot and at the point $P_4 40$ is, as the number of pulses, outputted at a specified speed from the command circuit 120.

The difference between the number of axis command pulses and the number of pulses from the pulse generator is outputted by a difference counter. The motor is controlled so that the output of the difference counter is zeroed. When the entire number of pulses between the present position and the point $P_4'$ is outputted by a command circuit 120 and the output of the difference counter becomes zero, the motor is stopped. The same operations are carried out for all the axes simultaneously.

The command circuit 120 operates to receive position pulse data from the microprocessor in FIG. 11 and to output them as axis command pulses uniformly with respect to time.

As is apparent from the above description, according to the invention, in general robots including articulated robots, cylindrical coordinates robots, polar coordinates robots, etc., the three-dimensional rotation plus parallel movement shift and mirror image shift of locus data including suitable wrist axis correction are achieved merely by correctly teaching three representative points.

Heretofore, it was required for the operator to teach all the points, when the robot handles objects similar in configuration or mirror image objects. However, this troublesome operation can be eliminated according to the invention. That is, all the coordinate data are automatically formed merely by teaching only one object and representative points. Thus, the teaching operation is greatly simplified. In addition, in the case where the tool is deformed, the teaching can be readily amended.

Furthermore, in the case where it is required to replace a robot, the robot must be replaced by another robot with high accuracy; however, according to the invention, in this case, it is unnecessary to strictly control the relative location of the robot, the jig and the object. Thus, production control can be achieved readily in the case where robots are used in a mass production line.

The above description is explained with the case where the coordinate data of first work points and first three representative points of an object are taught by the teaching operation. However, the invention is also useful to the case where, these coordinate data are given in form of the numerical values which are numeralized by use of a drawing of an object or any digitizer, and all the coordinate data of second work points are automatically formed through the above described method by use of these numerical coordinate data and second three representative points which are taught by the teaching operation.

The technical concept of the invention is applicable not only to the case where three representative points are given from an existing object by teaching, but also to the case where the X, Y and Z values of three points are given by a sensor such as a differential transformer.

In the case where, although the accuracy of an object is guaranteed, it is difficult to improve the accuracy because the object is large and accordingly a jig for receiving is intricated as in the case of a vehicle's chassis, a differential transformer is used to measure how much the three representative points of the object are shifted from the originally taught values, so that the X, Y and Z values thereof are utilized to correct the coordinate data of the representative points $P_1', P_2'$ and $P_3'$ thereby to convert the teaching data $P_4, P_5, \ldots, P_n, \ldots$ into those $P_4', P_5', \ldots, P_n', \ldots$ Therefore, even if the jigs are not uniform, the robots can be operated without additional teaching, and accordingly without stopping the line.

What is claimed is:

1. A method for robot arm locus control comprising the steps of:
    a. teaching the robot coordinates of a first three representative points and first work points of an object to be worked on by the robot;
    b. teaching the robot coordinates of a second three representative points of the object when a change in the relative position of the robot and the object occurs, said second representative points corresponding to said first representative points;
    c. calculating coordinates of second work points from data representative of the relative positions of said first representative points and first work points and said second representative points, so that said second work points define a locus at a position different than that of said first work points, said second work points corresponding to said first work points;
    d. using said coordinates of said second work points to provide commands for the robot; and
    e. controlling the robot to follow said commands.

2. The method of claim 1 in which said locus at said different position is congruent to a locus defined by said first work points.

3. The method of claim 1 in which said locus at said different position is a mirror image of a locus defined by said first work points.

4. The method of claim 1 in which said locus at said different position corresponds to a locus defined by said first work points but is longitudinally displaced therefrom.

5. The method of claim 1 in which said locus at said different position corresponds to a locus defined by said first work points but is rotationally displaced therefrom.

6. The method of claim 1 in which said locus at said different position corresponds to a locus defined by said first work points but is rotationally and longitudinally displaced therefrom.

7. The method of claim 1 in which the first three representative points are defined independently of geometric configuration of the object and the work points.

8. The method of claim 1 in which the robot has a wrist movable with respect to a wrist axis, the method further comprising the step of:
adding correcting values to values representative of a first posture of the wrist axes at said first work points to obtain a second posture of said wrist axis at said second work points.

9. The method of claim 8 in which posture of the wrist with respect to the object is maintained constant when the object is moved with respect to the robot.

10. The method of claim 1 in which the robot has a wrist movable with respect to a wrist axis, the method further comprising the step of controlling said wrist axis on a slave job so that an angle between an axis of a torch and a line connecting one representative point to a work point in a slave job is equal to an angle between the axis of said torch and a line connecting one corresponding representative point to a corresponding work point in a master job.

11. The method of claim 1, further comprising the steps of:
a. storing in a microprogram memory microprograms necessary for arithmetic operations,
b. buffering said microprogram memory by using a pipe line register;
c. controlling an execution sequence of microinstructions stored in said microprogram memory with a sequence controller;
d. executing operation instructions specified by said microprograms from said pipe line register by using a register and arithmetic logical unit including a logic and arithmetic operation unit (RALU) and a programmable register;
e. applying, through a multiplexer, in response to control instructions from said pipe line register, test conditions of a RALU status outputted by said register and arithmetic logical unit to said sequence controller;
f. using a microprocessor for transferring coordinate data of said representative points from a memory of said microprocessor to a first register and for outputting a macrocommand to said sequence controller in response to an arithmetic unit status from said pipe line register;
g. storing shifted coordinate data in a plurality of additional registers;
h. transferring the shifted coordinate data to said RALU; and
i. applying a jump address generated by said pipe line register to said sequence controller when a change of sequence of execution of said microinstructions stored in said microprogram memory is required.

12. A method for robot arm locus control comprising the steps of:
a. providing to the robot numerical values of coordinate data of first work points and a first three representative points of an object to be worked on by the robot;
b. providing to the robot values of coordinate data of a second three representative points of the object when robot trajectory based on numerical coordinate data of the first work points deviates from actual work lines of the object, said second three representative points corresponding to said first three representative points;
c. calculating values of second work point coordinate data from relative positions of said first three representative points, said first work points and said second representative points, said second work points corresponding to said first work points;
d. using values of said second work point coordinate data to provide commands for the robot; and
e. controlling the robot to follow said commands.

* * * * *